United States Patent [19]
Ito et al.

[11] Patent Number: 5,391,070
[45] Date of Patent: Feb. 21, 1995

[54] INJECTION MOLDING MACHINE EQUIPPED WITH A MOVABLE DISPLAY UNIT

[75] Inventors: Susumu Ito; Masato Yamamura; Koichi Nishimura, all of Yamanashi, Japan

[73] Assignee: Fanuc Ltd, Minamitsuru, Japan

[21] Appl. No.: 140,892

[22] Filed: Oct. 25, 1993

Related U.S. Application Data

[63] Continuation of Ser. No. 861,857, Jun. 18, 1992, abandoned.

[30] Foreign Application Priority Data

Nov. 2, 1990 [JP] Japan .................................. 2-295542

[51] Int. Cl.⁶ .............................................. B29C 45/76
[52] U.S. Cl. .................................. 425/135; 425/152
[58] Field of Search ................................ 425/135, 152

[56] References Cited

U.S. PATENT DOCUMENTS

| | | | |
|---|---|---|---|
| 4,773,842 | 9/1988 | Aoki | 425/190 |
| 4,775,309 | 10/1988 | Hehl | 425/135 |
| 4,976,598 | 12/1990 | Hehl | 425/135 |

FOREIGN PATENT DOCUMENTS

| | | |
|---|---|---|
| 0336249 | 10/1989 | European Pat. Off. . |
| 2561163 | 9/1985 | France . |
| 8902339 | 3/1989 | Germany . |
| 61-87914 | 6/1986 | Japan . |
| 63-107534 | 5/1988 | Japan . |
| 1-116614 | 8/1989 | Japan . |

*Primary Examiner*—Tim Heitbrink
*Attorney, Agent, or Firm*—Staas & Halsey

[57] ABSTRACT

An injection molding machine is equipped with a movable display unit, which provides improved operability and visibility without causing interference with an operator working on the periphery of the injection molding machine and which requires no housing space inside the injection molding machine. A swing arm 40 extends horizontally at the same height as an upper portion of a base 1 of the machine. The swing arm is supported on the base so as to be swingable at its base end portion through a first supporting means 50. The swing arm 40 is positioned between a mold clamping unit 10 and an injection unit 20 along an upper front surface of the base 1. A display unit 30 is supported on the front end of the swing arm through a second supporting means 60 so as to be rotatable in a horizontal plane. The display unit 30 can be set for any desired position or direction by horizontally changing the angle of either the swing arm or the display unit.

5 Claims, 4 Drawing Sheets

INJECTION MOLDING MACHINE EQUIPPED WITH A MOVABLE DISPLAY UNIT

This application is a continuation of application Ser. No. 07/861,857, filed. Jun. 18, 1992, now abandoned.

TECHNICAL FIELD

The present invention relates to an injection molding machine equipped with a movable display unit, and more particularly to a movable display unit having superior operability and visibility.

BACKGROUND ART

In an injection molding machine, such as an electric motor driven injection molding machine which includes a numerical control apparatus, a display unit equipped with a display screen and a manual data input device is utilized for setting various molding conditions, monitoring operational conditions alarming for the possible occurrence of abnormal operational condition and so on. Thus, the display unit is an important part of the injection molding machine.

Known conventional display units for injection molding machines are broadly categorized into three types; a stand type characterized in that a display unit is fixedly mounted on the top of a stand vertically standing from a floor, a built-in type characterized in that a display unit is housed inside the injection molding machine, and a pendant type which is characterized in that a display unit is suspended from a swing arm.

The stand type display unit has a disadvantage in that it can be an obstacle to workers, since it is fixedly disposed on the periphery of the injection molding machine. The built-in type display unit, especially a large size CRT display unit, large in both the size and weight, requires not only a larger housing space but a significant amount of labor for installation and removal from the injection molding machine.

The pendant type display unit (for example, as disclosed in the Japanese Unexamined Patent Application JP, A-63-107534) is convenient in that the display unit can change its position between an operational position and a retracted position. However, due to the restriction of mechanical strength, the length of the swing arm supporting the display unit must be limited. Thus, the movable range of the display unit is correspondingly limited. This is a drawback to the operability of the display unit, since an operator is limited in changing the position of the display unit to an optimum point.

Moreover, the swing arm needs to be placed at a fairly high position in order to avoid interference between the display unit and the main body of the injection molding machine. Accordingly, a pole to support the swing arm is required to have a considerable length which requires the rigidity of the supporting pole to be increased and therefore increase the cost.

Moreover, the pendant type display unit is usually positioned higher than an operation board of the injection molding machine, so that the operator needs to turn or look upwardly to watch the display screen or manipulate the data input apparatus of the display unit. Where it is necessary to alternately repeat the monitoring or manipulation of the display screen and the operation of the operation board of the injection molding machine, the operator is required to look in up-and-down directions. Thus, the pendant type display unit is disadvantageous in that the operator is required to turn and look so frequently.

SUMMARY OF THE INVENTION

An object of the present invention is to provide an injection molding machine equipped with a movable display unit having improved operability and visibility without causing interference between the display unit and an operator on the periphery of the injection molding machine, and which does not require any housing space inside the injection molding machine.

To accomplish the above object, the present invention provides an injection molding machine in which a mold clamping unit and an injection unit are disposed on a base opposite to each other. The injection molding machine comprises first supporting means disposed on an upper front surface of the base; a swing arm having a base end portion supported on the base through the first supporting means so as to be swingable in a horizontal plane and a front end portion extending horizontally from the base end portion at substantially the same height as an upper surface of the base second supporting means provided on the front end portion of the swing arm; and a display unit mounted on the second supporting means so as to be rotatable with respect to the swing arm.

As described above, in the injection molding machine according to the present invention, the display unit is rotatably supported on the swing arm which is supported swingably on the front surface side of the base of the injection molding machine. Thus, the display unit can be moved to any desired position as the operator wishes.

Thus, the operability and visibility of the display unit for the operator can be improved without causing interference between the display unit and workers on the periphery of the injection molding machine. Further, the display unit in accordance with the present invention, unlike the conventional unit of the built-in type, is superior in that it requires no housing space inside the injection molding machine.

Furthermore, since the swing arm is disposed at the same height as the upper surface of the base, the vertical position of the display unit can be optimized to improve the operability and visibility of the display unit.

BRIEF DESCRIPTION THE DRAWINGS

BEST MODE FOR CARRYING OUT THE INVENTION

Hereinafter, referring to FIGS. 1 to 6, one embodiment of the electric motor driven injection molding machine according to the present invention will be explained.

Figure 1:
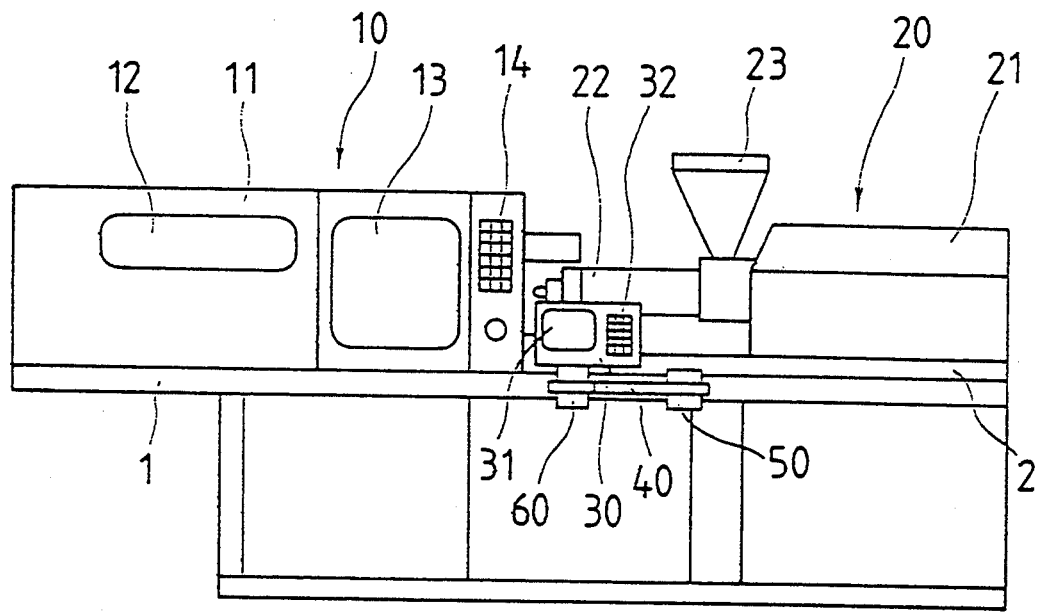
FIG. 1 is a schematic front view showing one embodiment of an electric motor driven injection molding machine in accordance with the present invention.

As shown in FIG. 1, the injection molding machine includes a mold clamping unit 10 fixed on a base 1 made of a hollow shaped-steel. The mold clamping unit 10 has a protective cover 11 covering the whole mold clamping mechanism (not shown). The protective cover 11 is provided with windows 12 and 13 with transparent-panels on its front surface for monitoring operating conditions of the mold clamping mechanism. Provided on a right end front surface of the protective cover 11 is an operation panel 14 for controlling various operations such as start-up, stop, emergency shutdown, manual operation mode, semi-auto operation mode, full-auto operation mode etc.

Furthermore, the injection molding machine includes a injection unit 20 disposed on the base 1 via an extruder base 2, opposite to the mold clamping unit 10. The injection unit 20 comprises a protective cover 21 for the body of the injection unit; an injection mechanism (not shown) which includes a front plate, a movable plate, and a rear plate; a cylinder assembly 22 housing a screw (not shown) detachably installed on the injection unit main body; and a hopper 23 disposed above the base end portion of the cylinder assembly 22.

The injection unit 20 is capable of moving toward and away from the mold clamping unit 10 together with the extruder base 2 on the base 1 so that a nozzle touch condition can be established or released. Moreover, the injection unit 20 is horizontally swingable about a swivel shaft 3 provided on the extruder base 2. The injection molding machine further comprises a movable display unit 30 having a CRT screen 31 and a manual data input apparatus 32, so that control information fed from a numerical control apparatus (not shown) can be displayed on the CRT screen 31, and an operator can manually input various data through the data input device 32.

The display unit 30 is supported on the front end portion of a swing arm 40 for being swingable in a horizontal plan. Swing arm 40 is supported on the front surface of the base 1 for being swingable in a horizontal direction. The display unit 30 can be swung with respect to the swing arm 40 so that it can selectively be set to any of its usual position A (FIG. 2), operational position B (FIG. 3) and its retracted position C (FIG. 4).

The swing arm 40 is of a hollow shape and is made of steel having a rectangular cross section and is slightly shorter than the distance between opposing surfaces of the mold clamping unit 10 and the main body of the injection unit 20.

Figure 5:
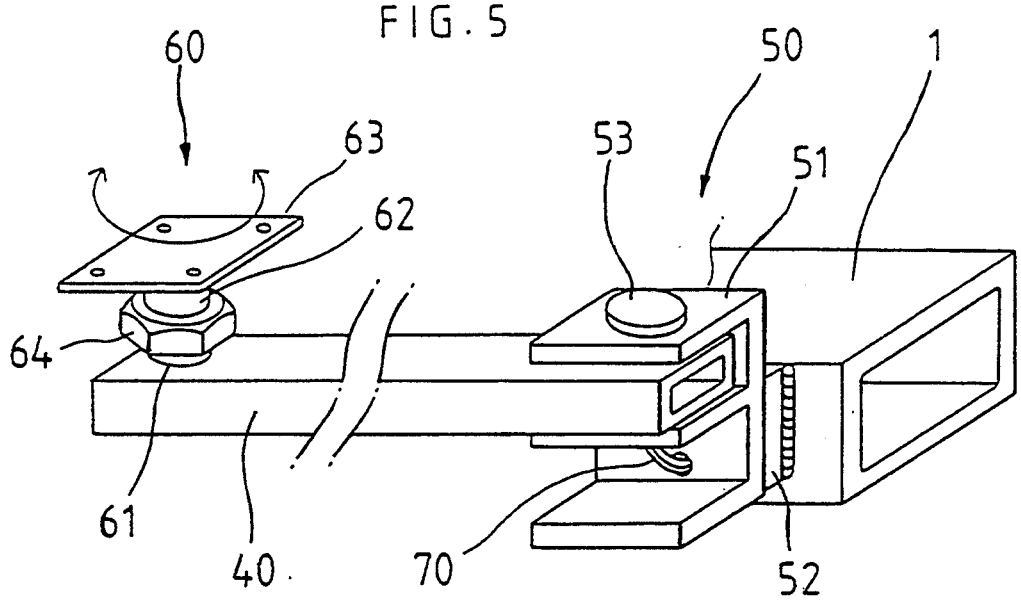
FIG. 5 is a partial enlarged perspective view showing a display unit swing arm and its peripheral components.

In its usual position A, the swing arm 40 is disposed between mold clamping unit 10 and the injection unit 20 in a longitudinal direction of the injection molding machine, extending horizontally along the upper front surface of the base 1 (FIGS. 1 and 5). The swing arm 40 has through holes in the upper and lower walls of its base end portion. A pair of upper and lower circular collars 41 and 42 are fit into these through holes and welded to the swing arm 40.

The injection molding machine has a first supporting means 50 disposed on the upper front surface of the base 1 to swingably support the swing arm 40 in a horizontal plan. A bracket 51 of the first supporting means 50 is fixed on the upper front wall of the base 1 through a rectangular shaped steel stay 52.

The bracket 51 has a vertical wall fixed to the stay 52 and an upper wall integrally formed with the vertical wall and extending horizontally from the upper end of the vertical wall, an intermediate wall integrally formed with the vertical wall and extending horizontally from the intermediate portion of the vertical wall, and a lower wall integrally formed with the vertical wall and extending horizontally from the lower end of the vertical wall.

The distance between the upper wall and the intermediate wall is made slightly larger than the distance between the upper surface of the upper collar 41 and the lower surface of the lower collar 42, so that the swing arm 40 can be inserted into a recessed space partitioned by the upper wall and the intermediate wall.

The intermediate wall of the bracket 51 is formed with a recessed portion having a bottom so that a flange portion of the lower collar 42 is fitted into the recessed portion. Further, the recessed portion communicates with a small-diameter through hole for inserting a cable.

On the other hand, the upper wall of the bracket 51 is provided with a large-diameter through hole, into which an intermediate portion of a supporting shaft 53 having an expanded head is mounted, and this large-diameter hole is aligned with the recessed portion in the intermediate wall.

Shaft 53 is inserted from the top into the hole of the upper collar 41 and the lower collar 42 is fitted in the recessed portion of the intermediate wall. With this arrangement, the base end portion of the swing arm 40 is supported on the base 1 so as to be swingable in a horizontal plan.

The vertical wall of the bracket 51 serves as a stopper, which restricts the horizontal swing range of the swing arm 40 within a predetermined angular range in front of the injection molding machine. The above-described usual position A (or the operational position B) is close to one of the end positions of the swing range of the swing arm 40. The retracted position C is close to the other end position of the swing range of the swing arm 40. The swing range is limited so that the display unit 30 is prevented from contacting or approaching too close to the mold clamping unit 10 and the injection unit 20 and the cylinder assembly 22.

The injection molding machine also includes a second supporting means 60, which is provided on the front end portion of the swing arm for swingably supporting the display unit 30 with respect to the swing arm 40. The second supporting means 60, includes a hollow cylindrical supporting shaft 51, which is fixed on the upper surface of the front edge portion of the swing arm 40 and extending vertically upward from the swing arm 40, and a hollow cylindrical supporting shaft 62 which is disposed coaxially with the supporting shaft 61 and supported swingably on the supporting shaft 61. A supporting plate 63 is fixed on the top edge of the supporting shaft 62 for mounting the display unit 30.

Though a detail drawing is omitted here, the diameter of the supporting shaft 62 is made smaller than that of the supporting shaft 61. However, the supporting shaft 62 has an enlarged lower end portion having substantially the same outer diameter as the supporting shaft 61.

Either of the supporting shafts 61 or 62 is integrally formed with an elongated cylindrical portion of a smaller-diameter, which is inserted into the hollow portion of the other of the shaft 61 or 62, so that the supporting shaft 62 can be supported securely on the supporting shaft 61.

A nut 64 is not only engaged with a screw portion formed on the upper outer peripheral surface of the supporting shaft 61 but engaged with the lower enlarged end portion of the supporting shaft 62 to prevent the supporting shaft 61 from coming off the supporting shaft 62.

Figure 6:
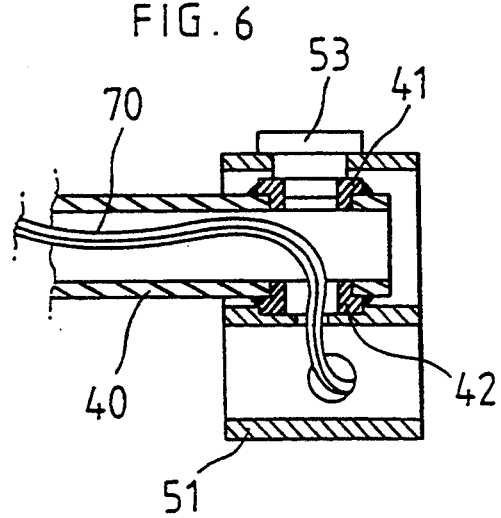
FIG. 6 is a partial enlarged cross-sectional front view showing a swing arm supporting means.

In FIG. 6, reference numeral 70 denotes a wiring cable disposed without a reinforcing or protective tube such as a conduit. The cable 70 extends from the display unit 30 and is connected to a numerical control apparatus and an electric power source via a cable hole (not shown) opening through the surrounding wall of the supporting shaft 62, hollows of the supporting shaft 62, supporting shaft 61, swing arm 40, lower collar 42, and cable hole openings through the intermediate wall of the bracket 51, the inside of the stay 52 and the base 1.

Hereinafter, the operation of the display unit and its peripheral components will be explained.

Figure 2:
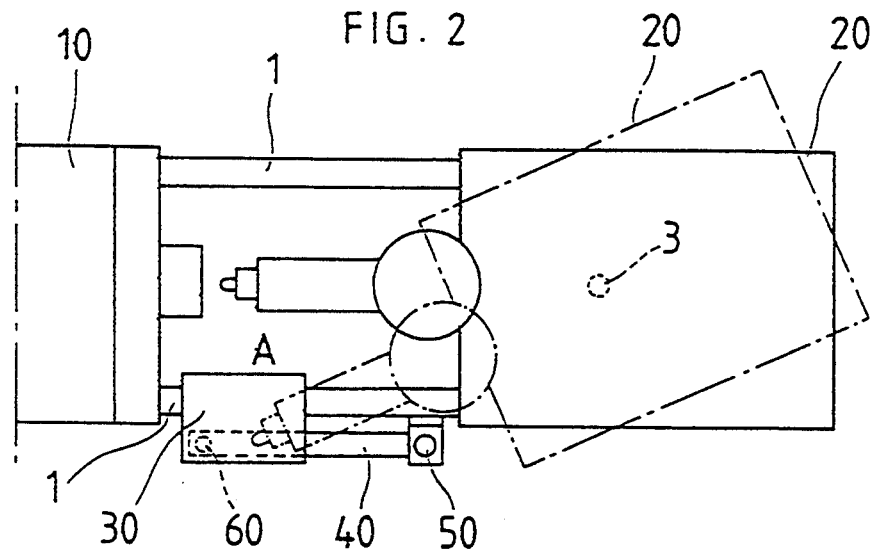
FIG. 2 is a partial schematic plan view showing an essential part of the injection molding machine when its display unit is placed in a non-operational position.

During the operation of the injection molding machine, the display unit 30 is placed at its usual position A shown in FIG. 2. In this case, the swing arm 40 extends horizontally along the upper front surface side of the base 1, whereas the display unit 30 is disposed above the base 1 between the mold clamping unit and the injection unit 20 with its CRT screen 31 facing front.

Though the display unit 30 is positioned slightly away outwardly from the base 1 with respect to the widthwise direction of the injection molding machine, it will not obstruct an operator working around the injection molding machine. The operator monitors the operating condition of the injection molding machine by referring to operational information displayed on the CRT screen 31. In this way, it is convenient for the operator in monitoring the operational condition since the CRT screen faces the operator.

Figure 3:
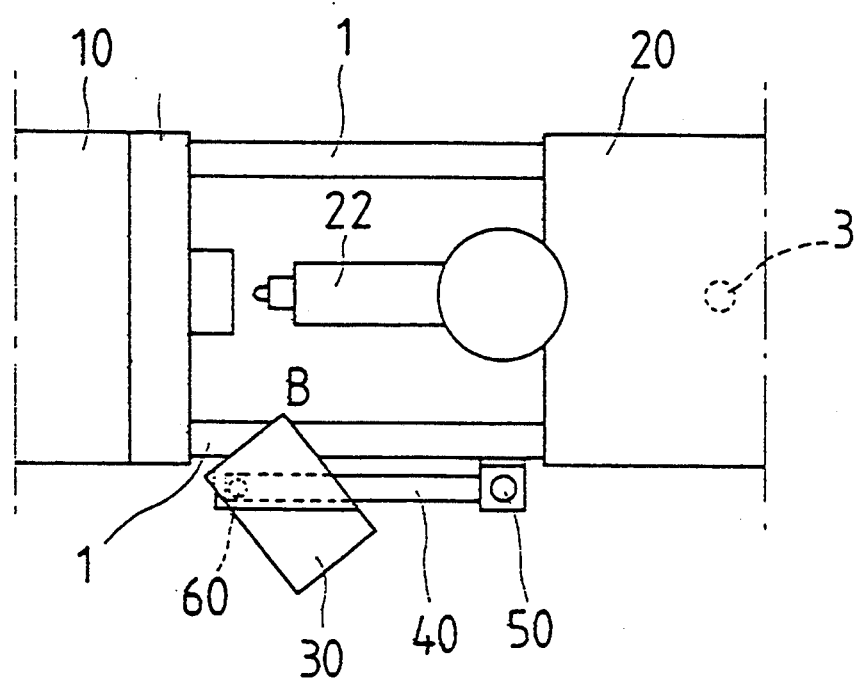
FIG. 3 is a partial schematic plan view showing an essential part of the injection molding machine when its display unit is placed in an operational position.
Figure 4:
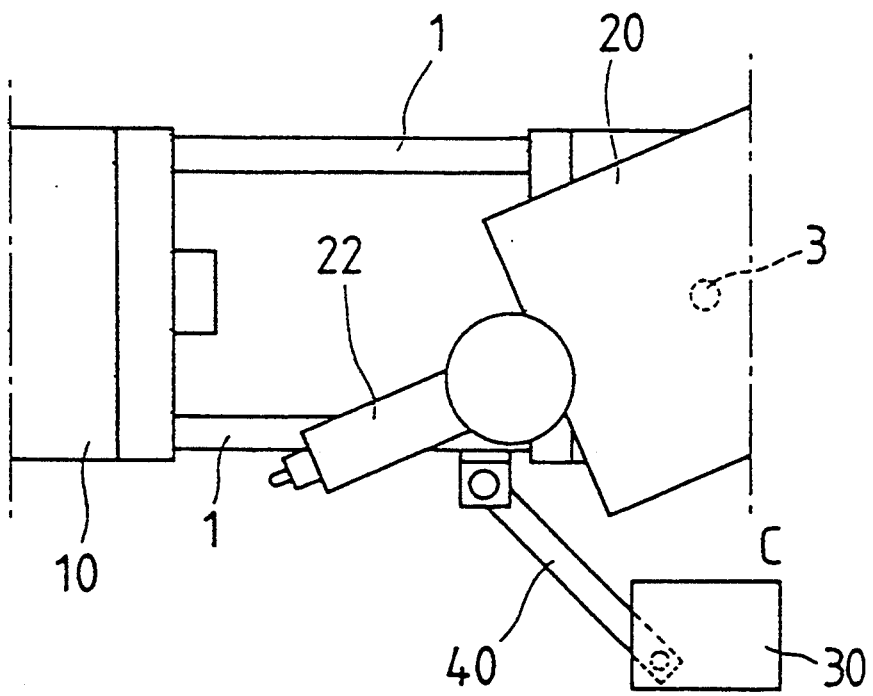
FIG. 4 is a partial schematic plan view showing an essential part of the injection molding machine when its display unit is placed in an retracted position.

The operator can shift the display unit 30 to the operational position B shown in FIG. 3 when necessary. For instance, the operator is allowed to turn the display unit 30 about the supporting shaft 61 by pulling forward the display unit 30 with his hand holding the right-hand side of the display unit. Thus, the angle of the CRT screen 31 can be adjusted in any direction such that the operator standing in front of the operation panel 14 can easily watch the CRT screen 31.

Thus, the operator, for example, with the display unit 30 set to the operational position B, can carry out a mold thickness adjustment after finishing a mold exchange operation. In such a situation, the operator can easily monitor the information relating to rear platen shift speed etc. displayed on the CRT screen 31. Thus, the operator can efficiently proceed with his work by manipulating the manual button, die height button, rear platen forward/backward button etc.

Furthermore, in the case where an emergency shutdown message and an alarm message etc. are displayed on the CRT screen, the operator can promptly react to these messages and carry out subsequent procedures safely.

Moreover, as shown in FIG. 4, sometimes the injection unit 20 is required to be turned horizontally about the swivel shaft 3 when, for example, the screw is changed. In this case, prior to the horizontal turning of the injection unit 20, the display unit 30 is shifted to the retracted position C (FIG. 4) for easier screw change operation without causing the display unit 30 to interefere with the injection unit 20, particularly with the cylinder assembly 22.

If the operator pulls the front end portion of the swing arm 40 toward the operator's side, the display unit 30 turns horizontally about the upper and lower collars 41, 42 and also about the supporting shaft 53 together with the swing arm 40. Further, the operator may adjust the direction of the display unit 30 by turning the display unit 30 about the supporting shaft 61 when necessary.

The present invention is not limited to the above disclosed embodiment, and therefore it is possible to modify it in various ways.

Figure 7:
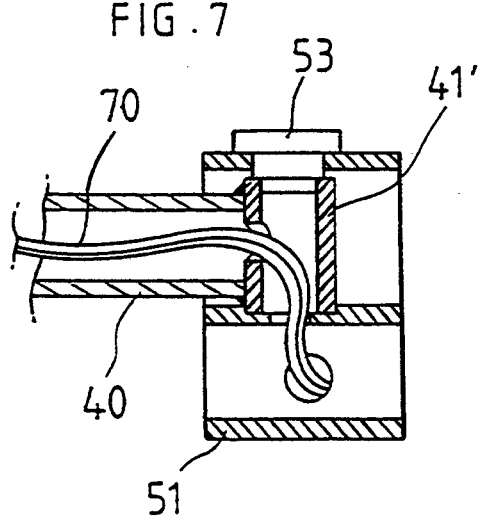
FIG. 7 is a partial enlarged cross-sectional front view showing a modified embodiment of the swing arm supporting means; and, FIG. 8 is a partial schematic plan view showing a modified embodiment of the injection molding machine wherein the swing arm supporting means is in a different position.

For example, though the above embodiment utilizes the upper and lower collars 41, 42 which engage with through holes formed on the base end portion of the swing arm 40, these collars 41, 42 can be replaced by a hollow cylindrical supporting shaft 41' shown in FIG. 7 so that this hollow cylindrical supporting shaft 41' can be fixed integrally with the base end portion of the swing arm 40. In this case, the cable hole is opened through the circumferential surface of the supporting shaft 41' on the swing arm side.

In the above embodiment, the length of the swing arm 40 is made slightly shorter than the distance between opposing surfaces of the mold clamping unit 10 and the injection unit main body; however, it may be either longer or shorter than that specified in the embodiment.

Furthermore, the above embodiment provides bracket 51 to serve as a stopper in restricting the horizontal swing range of the swing arm 40 within the predetermined angular range so that the swing arm 40 can be prevented from interfering with the mold clamping unit 10 and the injection unit 20; However, a separate stopper may be provided or a position-adjustable stopper capable of varying the swing range of the swing arm 40 may also be provided.

Moreover, instead of the display unit having a CRT screen 31, a display unit having a liquid crystal screen or other kind of display unit may also be used.

Figure 8:
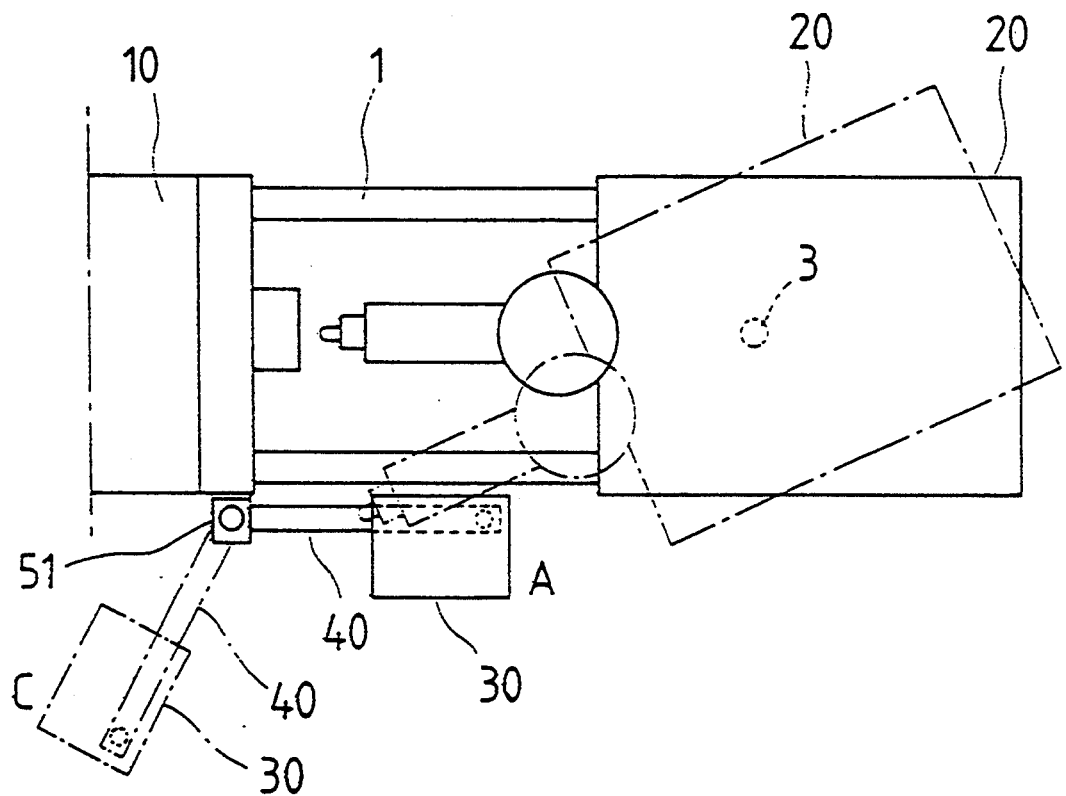

In the above embodiment, the bracket 51 of the first supporting means 50 is fixed to the base 1 between the mold clamping unit and the injection unit 20; however, as shown in FIG. 8, the bracket 51 may be fixed to the stationary platen cover of the mold clamping unit or to the bottom of the stationary platen cover of the base 1.

What is claimed is:

1. An injection molding machine comprising
a base comprised of a hollow rectangular pipe and having a front surface and an upper surface;
a mold clamping unit mounted on said base;
an injection unit mounted on said base opposite to said mold clamping unit;
a swing arm having a base end portion and a front end portion, said front end portion having an outer end and a top surface;
first supporting means disposed on said front surface of said base adjacent said upper surface of said base for pivotably mounting said base end portion of said swing arm to said base whereby said swing arm is swingable in a horizontal plan and said front end portion extends horizontally from said base end portion at substantially the same height as said upper surface of said base;

said first supporting means including a bracket having a vertical wall mounted to said front surface of said base and at least two spaced horizontal upper and lower walls extending outwardly from said vertical wall and a supporting shaft extending through said horizontal upper wall to pivotally mount said base and portion of said swing arm;

a display unit; and second supporting means mounted adjacent the outer end of the top surface of said front end portion of said swing arm for rotatably mounting said display unit on top of said swing arm.

2. An injection molding machine according to claim 1, wherein said swing arm is swingable through a defined swing range whereby when said swing arm is on one side of said swing range, said swing arm is disposed between said mold clamping unit and said injection unit.

3. An injection molding machine according to claim 2, wherein stopper means are provided for restricting the swing range of said swing arm so that said swing arm will not interfere with said mold clamping unit or said injection unit anywhere within said swing range.

4. An injection molding machine according to claim 1, wherein said injection unit includes a main body and said swing arm is of a length shorter than the distance between opposing surfaces of said mold clamping unit and said main body of said injection unit.

5. An injection molding machine comprising a base comprised of a hollow rectangular pipe and having a front surface and an upper surface;

a mold clamping unit mounted on said base;

an injection unit mounted on said base opposite to said mold clamping unit, said injection unit having a main body;

a swing arm having a base end portion and a front end portion, and having a length shorter than the distance between the opposing surfaces of said mold clamping unit and said main body, said from end portion of said swing arm having an outer end and a top surface;

first supporting means disposed on said front surface of said base adjacent said upper surface of said base for pivotably mounting said base end portion of said swing arm to said base whereby said swing arm is swingable in a horizontal plan and said front end portion extends horizontally from said base end portion at substantially the same height as said upper surface of said base, said first supporting means including a bracket having a vertical wall mounted to said front surface of said base and at least two spaced horizontal upper and lower walls extending outwardly from said vertical wall and a supporting shaft entending through aid horizontal upper wall to pivotally mount said base end portion of said swing arm; and wherein said swing arm is swingable through a defined swing range whereby when said swing arm is on one side of said swing range, said swing arm is disposed between said mold clamping unit and said injection unit;

stopper means for restricting the swing range of said swing arm so that said swing arm will not interfere with said mold clamping unit or said injection unit anywhere within said swing range;

a display unit; and second supporting means mounted adjacent the outer end of the upper surface of said front end portion of said swing arm for rotatably mounting said display unit on top of said swing arm.

* * * * *

UNITED STATES PATENT AND TRADEMARK OFFICE
CERTIFICATE OF CORRECTION

PATENT NO. : 5,391,070
DATED : February 21, 1995
INVENTOR(S) : SUSUMU ITO et al.

It is certified that error appears in the above-indentified patent and that said Letters Patent is hereby corrected as shown below:

On title page, item [75] Inventors: change "Susumu Ito; Masato Yamamura; Koichi Nishimura, all of Yamanashi, Japan" to --Susumu Ito; Masato Yamamura; Koichi Nishimura, all of Minamitsuru, Japan--.

Column 2, line 22, change "base" to --base;--;

line 47, change "DESCRIPTION THE" to --DESCRIPTION OF THE--;

line 59, change "an retracted" to --a retracted--.

Column 3, line 24, change "a injection" to --an injection--;

line 49, change "plan" to --plane--.

UNITED STATES PATENT AND TRADEMARK OFFICE
CERTIFICATE OF CORRECTION

PATENT NO. : 5,391,070
DATED : February 21, 1995
INVENTOR(S) : SUSUMU ITO et al.

It is certified that error appears in the above-indentified patent and that said Letters Patent is hereby corrected as shown below:

Column 4, line 4, change "plan" to --plane-- line 56, change "51" to --61--.

Column 6, line 4, change "terefere"

to --terfere--;

line 38, change "20;" to --20.--;

line 65, change "plan" to --plane--.

Column 8, line 11, change "plan" to --plane--;

line 19, change "aid" to --said--.

Signed and Sealed this

Twenty-seventh Day of June, 1995

Attest:

BRUCE LEHMAN

*Attesting Officer*      *Commissioner of Patents and Trademarks*